3,823,122
SYNTHETIC RUBBERS

Theodore R. Schuh, North Riverside and Frank A. Mauceri, La Grange, Ill., assignors to Nalco Chemical Company, Chicago, Ill.
No Drawing. Filed Oct. 1, 1971, Ser. No. 185,908
Int. Cl. C08d 5/02, 5/04
U.S. Cl. 260—85.1                                                                6 Claims

ABSTRACT OF THE DISCLOSURE

The oil or solvent resistance of SBR synthetic rubbers is substantially improved by incorporating in the rubber mix a substituted acrylic acid or acid salt. The amount of additive incorporated in the elastomer ordinarily varies from about 2.5 to 5.0 phr. of the elastomer. Zinc methacrylate and α-methyl cinnamic acid are among the preferred additives.

BACKGROUND OF THE INVENTION

Synthetic rubbers such as those based on butadiene-styrene copolymers have long been used with success in making numerous products. During the Second World War the United States was forced to produce large quantities of synthetic rubber. The product was designated GR–S (government rubber-styrene). Such rubbers are now known as SBR (styrene-butadiene rubber). The original commercial production of GR–S was carried out in batch reactors which operated under pressure. The process was carried out to a 78% conversion at 50° C. for fourteen hours. The rubber recipe contained about 75 parts of butadiene, 25 parts of styrene, a chain transfer agent (usually dodecyl mercaptan), water, soap, and various other additives. Subsequently, it was found that a "cold rubber" could be prepared in emulsion systems at temperatures as low as $-10°$ C. by using an initiation system which is active at low temperatures. These initiation systems usually included a redox catalyst compound of organic hydroperoxide and ferrous sulfate. The "cold rubbers" had improved properties over SBR produced at 50° C.

A substantial research effort has been undertaken to improve further the various properties of synthetic elastomers. For example, a carbon black reinforcing filler is added to improve the tensile strength of the product. Efforts have also been made to improve liveliness and resilience of elastomers. Another problem that has caused concern especially with respect to SBR synthetic rubbers involves their susceptibility to damage from solvents or oils. It is important that certain rubber products such as automobile tires, seals, gaskets, O-rings, couplings and hose or the like, resist the action of oil or other solvents. Additives that have been employed for this purpose in the past, however, have not produced satisfactory results.

It is therefore an object of the present invention to provide an additive which gives a synthetic elastomer improved solvent and oil resistance properties.

A further object of the invention is to provide an SBR vulcanizate which approaches neoprene rubber or GR–N rubber in its solvent and oil resistance properties.

BRIEF DESCRIPTION OF THE INVENTION

In general, the present invention involves the discovery that the addition of minor amounts of a substituted acrylic acid or acid salt to an SBR recipe markedly improves certain properties of the product. More particularly, the addition of the substituted acrylic acid or acid salt improves the oil and solvent resistance of SBR vulcanizates. The amount of additive incorporated in the SBR recipe can vary widely. It has been found that from 1 to 15 parts per hundred parts of rubber is satisfactory for most purposes. It is preferred, however, that from 2.5 to 5.0 phr. of the additive be employed. The substituted acrylic acid can be added to the rubber mix in the Banbury or on the mill. The subject additives can also be used in other rubbers such as nitrile rubbers or neoprenes. Its effect is particularly pronounced, however, when used in an SBR vulcanizate.

DETAILED DESCRIPTION OF THE INVENTION

The additive that is employed in the present process can be designated as a substituted acrylic acid. At least one and preferably two of the hydrogens connected to the alpha and beta carbons of acrylic acid are replaced by other specific groups. In general, the additive has the formula

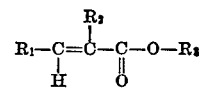

where $R_1$ is hydrogen, phenyl, benzyl, alkyl of 1 to 6 carbons, cycloalkyl of 5 to 8 carbons, chloro, bromo, iodo and cyano and wherein $R_2$ can also be hydrogen, phenyl, benzyl, alkyl of 1 to 6 carbons, cycloalkyl of 5 to 8 carbons, chloro, bromo, iodo and cyano, with the proviso that where $R_1$ is hydrogen, $R_2$ can not be hydrogen. $R_3$ is either hydrogen or a polyvalent metal. Any one of a wide variety of polyvalent metals can be employed, including zinc, magnesium, calcium, strontium, barium, aluminum, iron, chromium, manganese, nickel, etc. The preferred compounds of the present invention include zinc methacrylate, α-methyl cinnamic acid and its salts.

The invention will be illustrated in connection with the additive zinc methacrylate. Zinc methacrylate can be formed without difficulty by reacting sodium methacrylate with zinc chloride. The physical characteristics of the zinc methacrylate additive are as follows:

Form _____ Finely Divided Powder.
Color _____ White.
Odor _____ Very Slight—Acidic.
Melting Point _____ Above 200° F.
Bulk Density _____ Approx. 300 lbs./cu. ft.
Storage Stability ____ Greater than 6 months at 72° F.

Another preferred additive, α-methyl cinnamic acid, has a tan color and a slightly higher melting point.

The embodiment set out in the subsequent example will serve to illustrate the invention.

EXAMPLE

In this example zinc methacrylate was added to a typical SBR formula, and the resultant material was compared with the other SBR and neoprene compositions. The test compositions were as follows:

|  | I | II | III | IV |
|---|---|---|---|---|
| 1502 | 100.0 | 100.0 |  | 75.0 |
| Neoprene WRT |  |  | 100.0 | 25.0 |
| HAF Black | 50.0 | 50.0 |  | 50.0 |
| SFR Black-HM |  |  | 30.0 |  |
| Hi Aromatic Oil | 10.0 | 10.0 |  |  |
| Extending oil (Tufflo 500) |  |  | 5.0 | 10.0 |
| Antioxidant (Neozone D) | 1.0 | 1.0 | 1.0 | 1.0 |
| Stearic acid | 2.0 | 2.0 | 0.5 | 1.5 |
| Zinc oxide | 3.0 | 3.0 | 4.0 | 3.0 |
| Magnesium oxide |  |  | 5.0 | 2.0 |
| Sulfur | 2.0 | 2.0 |  | 1.5 |
| Vulcanizing agent | 1.25 | 1.25 |  | 1.0 |
| Curing agent for neoprene (2-mercaptoimidazole) |  |  | 0.5 | 0.25 |
| Zinc methacrylate |  | 5.0 |  |  |

Various properties of the above formulations were tested. The results of these tests were as follows:

CURE PROPERTIES

|  | Scorch time at 314° F., min. | Cure time at 314° F., min. | Max. torque |
|---|---|---|---|
| Standard SBR (I) | 15.0 | 31 | 62 |
| SBR plus 5 phr. zinc methacrylate (II) | 14.0 | 32 | 70 |

NOTE.—A Monsanto MPV Rheometer was used to determine the above properties using a 3° arc and 10 r.p.m.

UNAGED PHYSICAL PROPERTIES

| Compound No. | 300% modulus, p.s.i. | 500% modulus, p.s.i. | Tensile, p.s.i. | Ultimate elongation, percent | Shore A hardness |
|---|---|---|---|---|---|
| I | 2,000 | 3,075 | 3,425 | 530 | 62 |
| II | 2,350 |  | 3,600 | 450 | 64 |
| III | 1,725 |  | 2,300 | 320 | 62 |
| IV | 1,400 | 2,700 | 3,100 | 500 | 58 |

HEAT AGING RESULTS
212° F. in forced air oven

| Compound No. | Aging time, days | 100% modulus, p.s.i. | 300% modulus, p.s.i. | Ultimate tensile, p.s.i. | Ultimate elongation, percent |
|---|---|---|---|---|---|
| I | 3 | 525 | 2,075 | 3,200 | 520 |
|  | 5 | 650 | 2,100 | 3,000 | 480 |
|  | 7 | 700 | 2,175 | 3,050 | 450 |
|  | 14 | 950 | 2,350 | 2,650 | 350 |
| II | 3 | 600 | 2,400 | 3,500 | 440 |
|  | 5 | 6 0 | 2,525 | 3,600 | 410 |
|  | 7 | 800 | 2,625 | 3,500 | 380 |
|  | 14 | 900 | 2,850 | 3,400 | 360 |
| III | 3 | 725 |  | 2,300 | 310 |
|  | 5 | 750 |  | 2,200 | 285 |
|  | 7 | 725 |  | 2,300 | 270 |
|  | 14 | 825 |  | 2,350 | 240 |

WATER IMMERSION TESTS
212° F. for 14 days

| Compound number | 100% modulus, p.s.i. | 300% modulus, p.s.i. | Ultimate tensile, p.s.i. | Ultimate elongation, percent | Vol. percent swell | Water pickup, percent |
|---|---|---|---|---|---|---|
| I | 400 | 2,100 | 3,400 | 520 |  |  |
| After aging | 450 | 2,050 | 3,200 | 420 | 6 | 2.6 |
| II | 450 | 2,400 | 3,600 | 450 |  |  |
| After aging | 500 | 2,850 | 3,000 | 370 | 6 | 4.8 |
| III | 800 | 2,100 | 2,300 | 300 |  |  |
| After aging | 850 |  | 2,000 | 275 | 9 | 8.1 |

OIL RESISTANCE TESTS

| Compound number | 100% modulus, p.s.i. | Ultimate tensile, p.s.i. | Ultimate elongation, percent | Percent volume swell |
|---|---|---|---|---|
| ASTM Oil #3—212° F. for 70 hours | | | | |
| I | 250 | 450 | 150 | 175 |
| II | 400 | 900 | 200 | 100 |
| III | 300 | 1,150 | 225 | 90 |
| IV | 200 | 500 | 150 | 150 |
| Deodorized kerosene—212° F. for 70 hours | | | | |
| I | 130 | 210 | 130 | 210 |
| II | 250 | 460 | 160 | 130 |
| III | 290 | 840 | 200 | 85 |
| IV | Too weak to test | | | |

As is apparent from the above tests, the addition of a minor amount of zinc methacrylate to the SBR recipe markedly improved certain properties of the product. The tensile strength was improved, as was the 300% modulus. In the oil resistance test the product was far superior to the conventional SBR formula represented by Compound No. I. The ultimate tensile strength of the product after the oil resistance tests was at least twice as great as the modified product. This result is surprising and could not have been predicted based on ones knowledge of the formulation and additive compound.

Although the invention has been illustrated primarily in connection with zinc methacrylate, other compounds falling within the scope of the formula set forth above, act in a comparable manner. Preferred compounds in addition to zinc methacrylate include α-methyl cinnamic acid and its zinc salt.

We claim:

1. An improved elastomer composition containing as said elastomer a material selected from the group consisting of styrene-butadiene elastomer and neoprene elastomer which composition includes as an additive from 1 to 15 parts per hundred parts of SBR of a compound of the formula

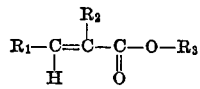

wherein R, is hydrogen, phenyl, benzyl, alkyl of 1 to 6 carbons, cycloalkyl of 5 to 8 carbons, chloro, bromo, iodo and cyano and wherein $R_2$ can also be hydrogen, phenyl, benzyl, alkyl of 1 to 6 carbons, cycloalkyl of 5 to 8 carbons, chloro, bromo, iodo and cyano, with the proviso that where R, is hydrogen, $R_2$ cannot be hydrogen and wherein $R_3$ is either hydrogen or a polyvalent metal.

2. An improved styrene-butadiene elastomer composition as in claim 1 wherein said additive is zinc methacrylate.

3. An improved styrene-butadiene elastomer composition as in claim 1 wherein said additive is a α-methyl cinnamic acid.

4. An improved styrene-butadiene elastomer composition as in claim 1 wherein the amount of said additive is from 2.5 to 5.0 parts per hundred of SBR.

5. An improved styrene-butadiene elastomer composition as in claim 1 wherein said polyvalent metal is selected from the group consisting of zinc, magnesium, calcium, strontium, barium, aluminum, iron, chromium, manganese and nickel.

6. An improved styrene-butadiene elastomer composition as in claim 1 which contains from 2.5 to 5.0 parts per hundred parts of SBR of zinc methacrylate.

References Cited
UNITED STATES PATENTS

| 3,522,222 | 7/1970 | Taylor | 260—93.7 X |
| 3,609,111 | 9/1971 | Kumanotani | 260—29.7 H X |
| 3,317,453 | 5/1967 | MacDonald et al. | 260—33.4 |
| 3,471,432 | 10/1969 | Krol et al. | 260—31.2 |
| 3,551,392 | 12/1970 | Snyder et al. | 260—78.4 |
| 3,553,176 | 1/1971 | Fujisaki et al. | 260—78.4 |
| 3,616,363 | 10/1971 | Millian | 260—78.4 DX |

JOSEPH L. SHOFER, Primary Examiner
W. F. HAMROCK, Assistant Examiner

U.S. Cl. X.R.
260—83.3, 92.3, 94.7 A, 96